United States Patent
Baroncelli

(10) Patent No.: US 6,728,492 B1
(45) Date of Patent: Apr. 27, 2004

(54) 40 GBIT/S SONET FRAMER WITH MULTIPLE CLOCK-CROSSING CAPABILITY

(75) Inventor: Clara Baroncelli, Plano, TX (US)

(73) Assignee: Alcatel, Paris (FR)

( * ) Notice: Subject to any disclaimer, the term of this patent is extended or adjusted under 35 U.S.C. 154(b) by 571 days.

(21) Appl. No.: 09/728,176

(22) Filed: Dec. 1, 2000

(51) Int. Cl.[7] .............................................. H04J 10/00
(52) U.S. Cl. ........................ 398/154; 398/50; 398/56; 398/155; 370/509
(58) Field of Search .................... 398/50, 56, 154–155; 370/324, 503, 509, 907; 375/354

(56) References Cited

U.S. PATENT DOCUMENTS 6,597,214 B1 * 7/2003 Singh et al. ................ 327/141
6,647,026 B1 * 11/2003 Tanaka ....................... 370/509

2001/0038476 A1 * 11/2001 Wolf ........................... 359/124

FOREIGN PATENT DOCUMENTS

CA        2 339 463        * 9/2002

* cited by examiner

Primary Examiner—Kinfe-Michael Negash
(74) Attorney, Agent, or Firm—Jackson Walker, L.L.P.; Jessica W. Smith; V. Lawrence Sewell

(57) ABSTRACT

A SONET framer with multiple clock-crossing capability for use in an optical cross-connect system. The input stage of the cross-connect includes a framer ASIC that performs both frame alignment of multiple data streams and retimes them with a system clock at a same frequency. The ASIC processes multiple clocks from PLL's and retimes the data with the system clock at the same frequency. The present invention nests the clock crossing function in the frame alignment function in order to align all the incoming data streams with the system clock. Advantages include reduced chip area and reduced power consumption.

20 Claims, 7 Drawing Sheets

40 GBIT/S SONET FRAMER WITH MULTIPLE CLOCK-CROSSING CAPABILITY

FIELD OF THE INVENTION

The present invention is generally related to optical communications systems, and more particularly to optical cross-connect systems receiving multiple streams of asynchronous data that are not synchronized with respect to each other or with respect to a system clock of the cross-connect.

BACKGROUND OF THE INVENTION

Optical cross-connect switches are utilized in optical communication systems and networks to redistribute a plurality of high data rate optical signals. For instance, in an optical OC-192 system a cross-connect switching matrix may be adapted to receive 64 STS-12 bitstreams, which requires the cross-connect to recover 16 separate clocks one for aggregates of 4 of these asynchronous data streams. The framer block provides the synchronization that receives data after the input stage of the system, and aligns the input data streams relative to the synchronization signal (SYNC), so that these multiple streams of data are ready for switching.

The problem lies in that the phase relationships between each of the 16 recovered clocks, typically recovered using a phase lock loop (PLL) circuit, and also with respect to a separate system clock, are totally random and thus unpredictable. Thus, one requirement of an optical cross-connect is to perform frame alignment of all 64 STS-12's and also retime the received STS-12 data streams with the system clock running at the same frequency, but at a different phase. That is, in an optical cross-connect system, there is required, on top of the switching block, some synchronization controllers that make sure this switching is done correctly at the proper time.

In larger system architectures, such as a high-speed, high density, 40 Gbit/s cross-connect, an ASIC is typically used. Conventionally, this ASIC has a high gate area consumption and power dissipation, especially in the case of many input frames (i.e. 64 STDS-12's).

One known solution is based upon sub-dividing the functional blocks of the cross-connect into three separate sub-blocks. Block 1 performs 16 byte alignments of 4 STS-12's each within each recovered clock domain. Block 2 moves the aligned bytes from the receiver clock domains into the unique system clock domain. Block 3 processes the synchronous bytes and sets them all on the same frame alignment. The order of Block 1 and Block 2 is interchangeable. However, in existing solutions, Block 2 requires at least three levels of data retiming, and Block 3 requires a number of retime stages that depends on a maximum input skew of the data, in this case being 3 retime stages. The problem with this approach is the high area of silicon consumption in an application specific integrated circuit (ASIC) and its associated power dissipation, which is significant when many input frames are provided, such as 64 STS-12's in a 40 Gbit cross-connect ASIC.

There is desired an approved solution having significant silicon area and operating power savings. The design should be generalized and usable for many input frames as desired. The design should be usable within a SONET/SDH environment.

SUMMARY OF THE INVENTION

The present invention achieves technical advantages as an optical cross-connect circuit and methodology whereby a framer block is configured such that the retiming stages necessary in both Block 2 and in Block 3 are shared, thereby reducing the area and power consumption of the whole Block. A uniquely located frame synchronization identifier (SYNC) is manipulated in Block 2 for the purpose of driving the clock-crossing control logic so that the data moves safely from the first time domain (receiver) to the second clock domain (transmitter), and at the same time get aligned. The framer block provides the synchronization that receives data after the input stage of the system, and aligns the input data streams relative to the synchronization signal (SYNC), so that these multiple streams of data are ready for switching. The framer has an input stage that parallelizes data to slow it down to ⅛ of the input data rate, such as using a 1-to-8 serial in parallel out (SIPO) based on the recovery clocks. This data comes from multiple sources, and the sources are not necessarily, and usually not, synchronized to each other, and thus, don't carry a clock with them due to the high speed characterization of this block.

DETAILED DESCRIPTION OF THE PREFERRED EMBODIMENT

Figure 1:
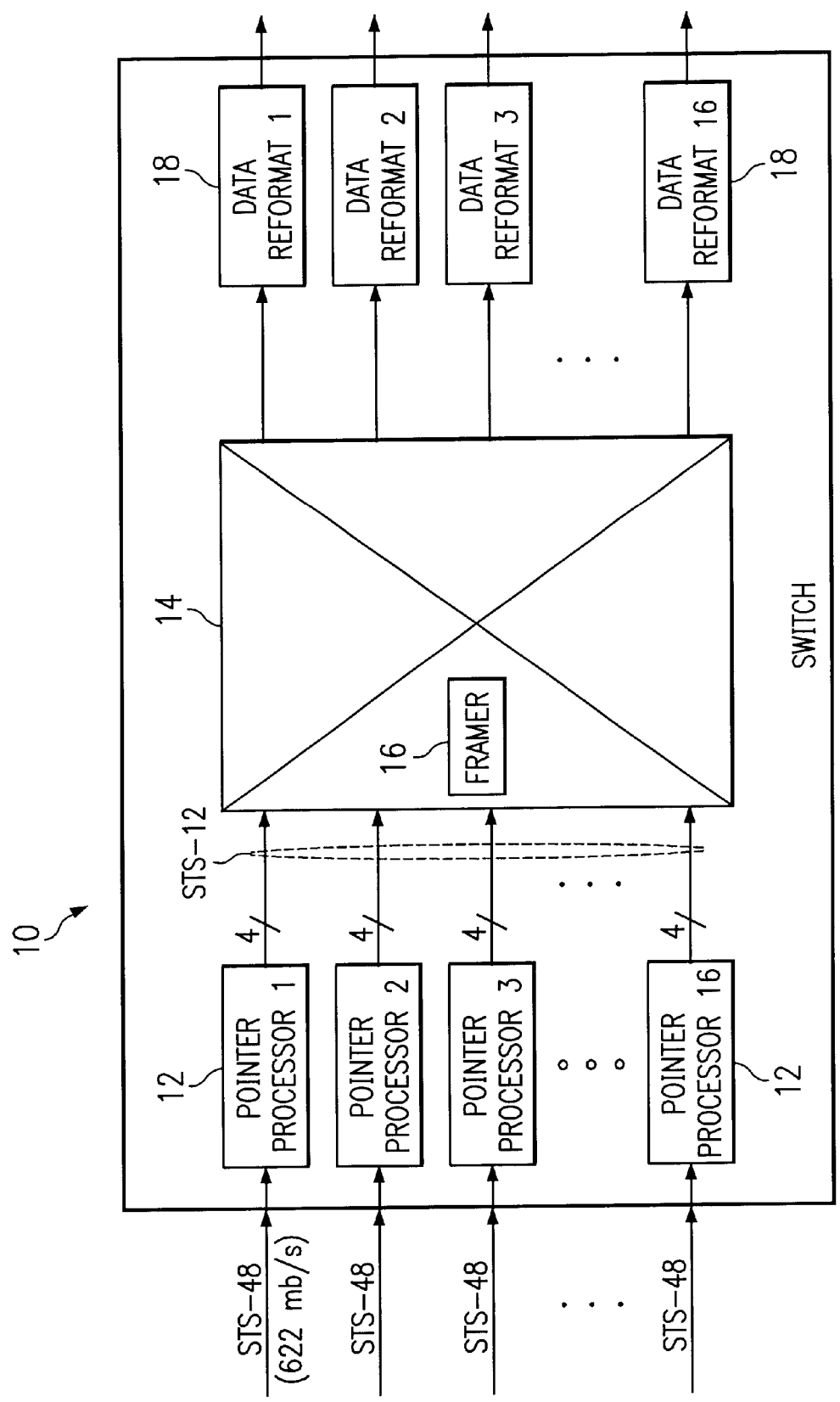
FIG. 1 is a system block diagram of a 10 Gbit/s data cross-connect receiving 16 STS-48's. This system consists of a pointer processors, a switch including a framer according to the present invention, and data reformat blocks.

Referring to FIG. 1, there is illustrated generally at 10 an optical cross-connect adapted to receive 10 Gbit/s of data configured as 16 STS-48's each having a data rate of 622 Mbit/s. One pointer processor 12 is adapted to receive data from each of the associated STS-48's. Each pointer processor 12 formats the incoming data as 4 STS-12's which are provided to an optical switch 14 including a framer ASIC 16 according to the preferred environment to the present invention. The switch 14 and associated framer 16 synchronize the received bytes with the independent system clock and forward the synchronized bytes to data reformat circuits 18 as shown. Framer 16 within switch 14 is the synchronization controller that makes sure the switching is done correctly at the proper time. The framer resides inside an ASIC chip, whereby data comes from multiple sources, which sources are not synchronized to each other.

Figure 2:
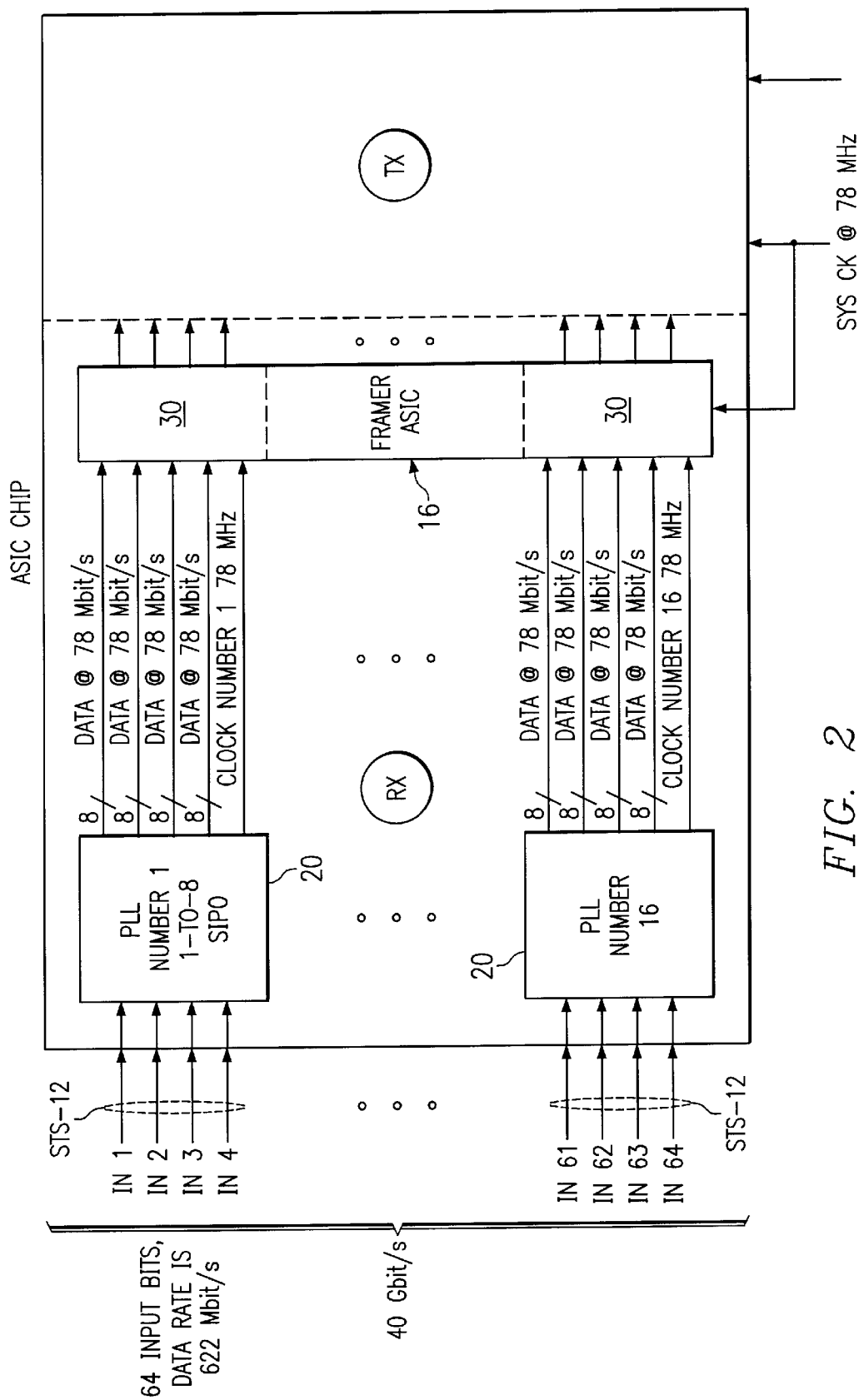
FIG. 2 illustrates the framer according to the present invention embodied as an ASIC chip adapted to both align and synchronize the 64 bytes that contain 16 STS-48 frames, and also safely move the 64 aligned bytes from the RX site of the chip to the TX side of the chip, these bytes having an unknown clock phase relationship.

Referring now to FIG. 2, there is illustrated the framer ASIC 16 adapted to receive parallelized data from a plurality of analog phased lock loop (PLL) integrated circuits 20, as shown. Each PLL 20 receives 4 STS-12's, and which PLL parallelizes each STS-12 using a1-to-8 serial in parallel out (SIPO) which slows down each of the 622 Mbit/s STS-12 to a 78 Mhz parallelized data stream. Each PLL 20 also recovers 78 Mhz the clock from the associated asynchronous data streams of the STS-12 signals. The problem lies in that each of the STS-48 data streams provided to the pointer processors 12, as shown in FIG. 1, are 32-bit data streams that are not synchronized to each other, and that, although they all run at the same frequency, the phase relationship among this data is an unknown a priori. Consequently, the 16 recovered PLL 78 Mhz clocks are also not phased aligned with respect to each other, and are also not phase aligned with the system clock for the transmitter circuit shown in FIG. 2.

The present invention recognizes, however, that there are some restrictions on how big this phase skew can be due to the pointer processors 12 being located in the input side of the system, before the framer ASIC 16. It can be assumed that the phase relationship among the aggregate of the 16 PLL recover clocks is +/−3 78 Mhz clocks due to the requirements of the cross connect system.

Slowing down the data by demuxing facilitates both frame alignment and crossover to the system clock, as will now be described in more detail with discussion of the framer ASIC 16 being discussed in reference to FIG. 3.

Figure 3A:
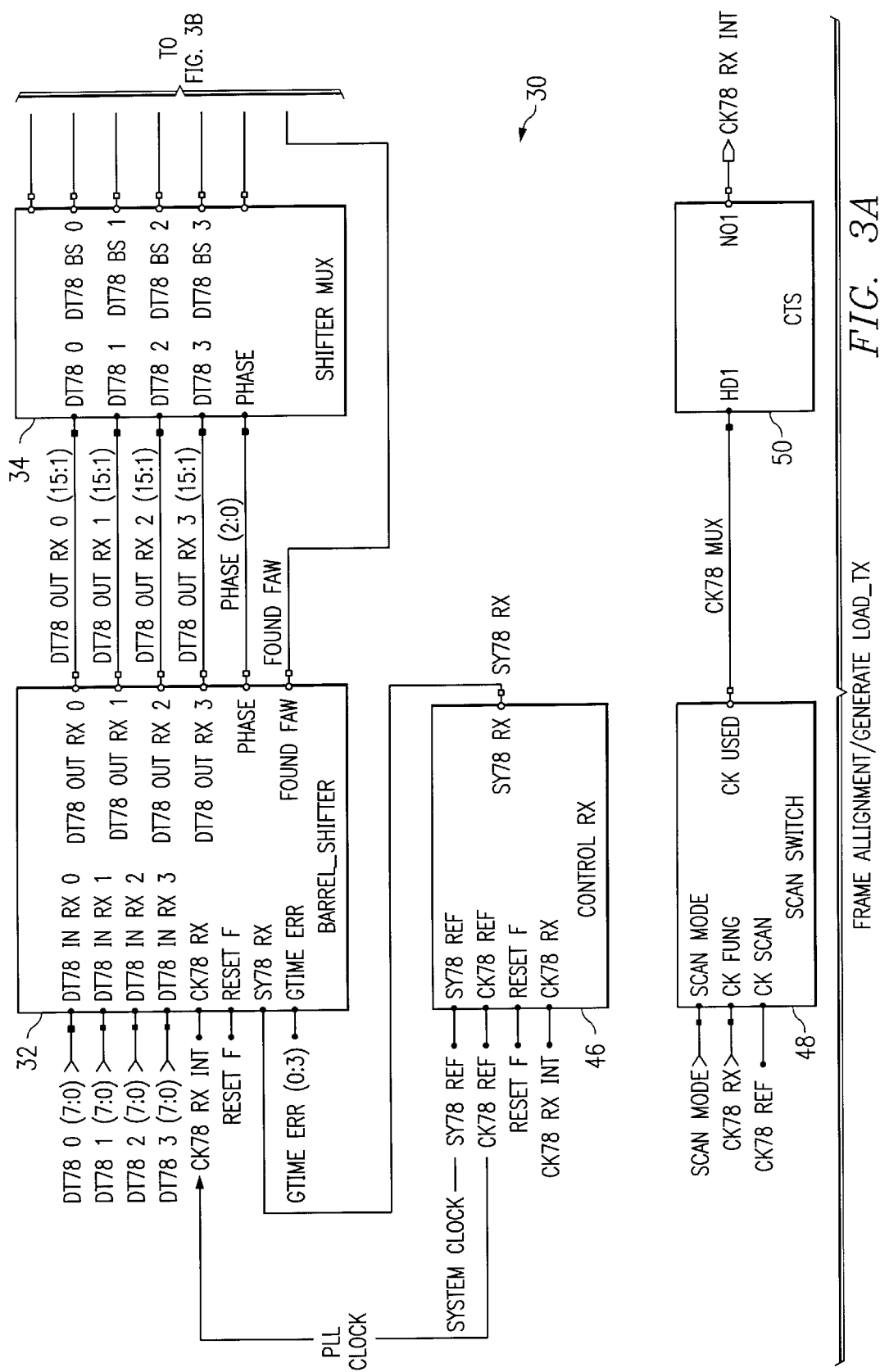
FIG. 3 is a block diagram of one section of the framer which receives the slowed down parallelized data.
Figure 3B:
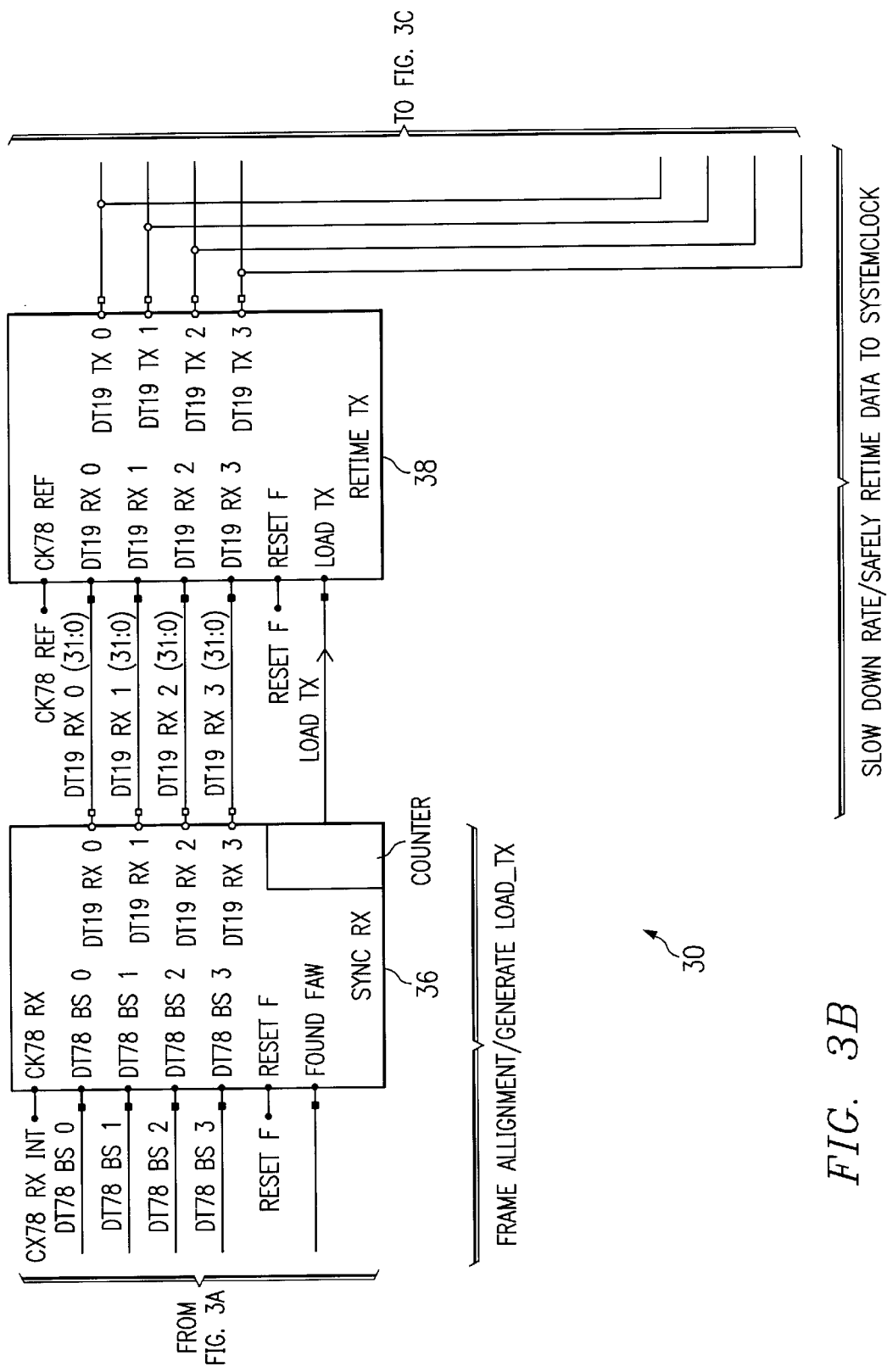
Figure 3C:
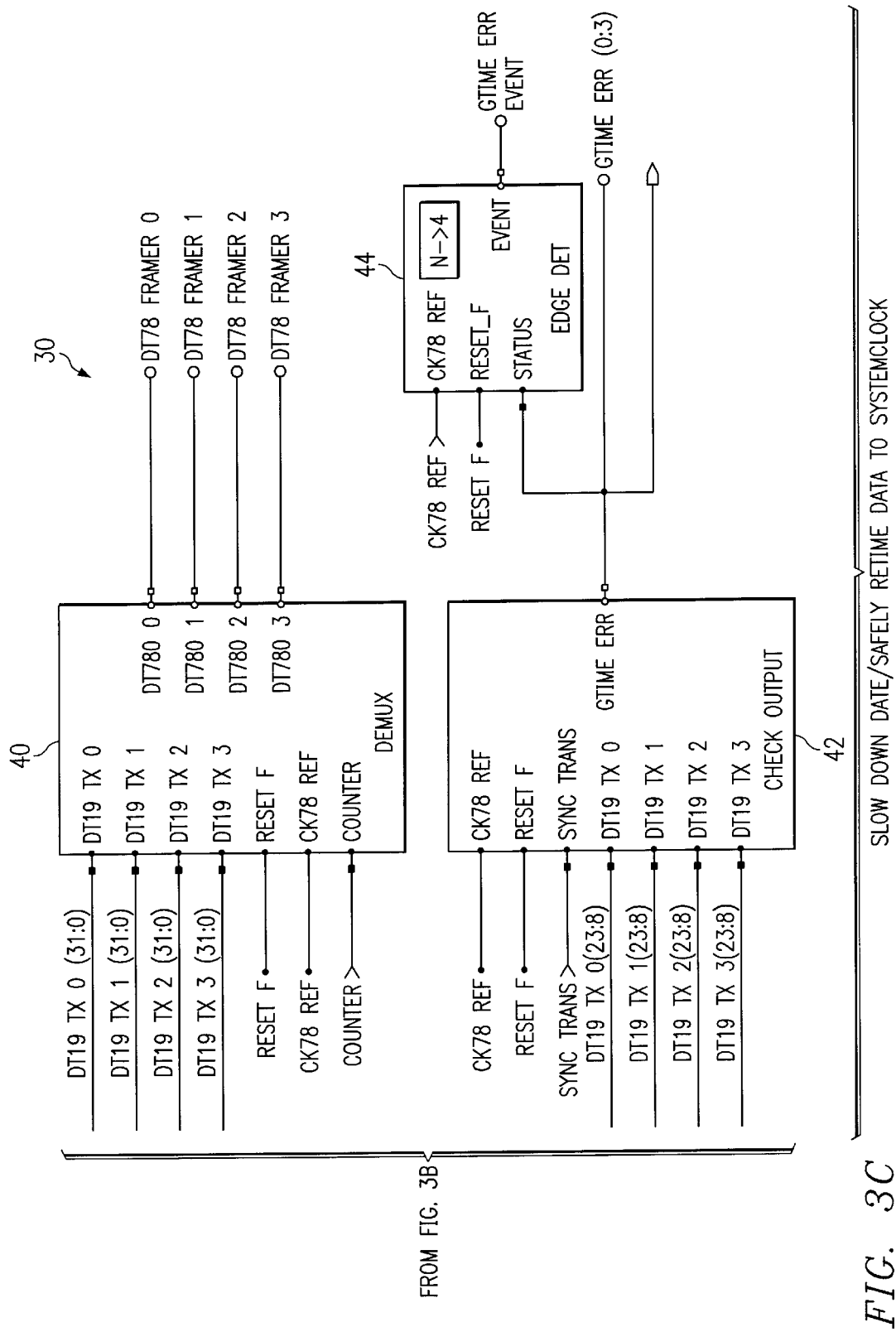

Referring to FIG. 3, there is shown a circuit 30 being one of sixteen identical circuits comprising ASIC 16, each circuit 30 adapted to process one set of the parallelized 78 Mbit/s data streams from the respective PLL 20. In fact one advantage of this invention is its modularity. Thus for purposes of illustration, clarity and brevity, only one circuit 30 of the circuit 16 is shown as it corresponds to one respective PLL 20, as shown in FIG. 2. A separate identical circuit 30 is provided for each of the sixteen PLL's 20 to process the slowed down parallelized 78 Mbit/s data streams, and namely, synchronizing the data streams with the 78 Mhz system clock safely.

Each clock synchronization circuit 30 comprises a barrel shifter circuit 32, a shifter MUX circuit 34, a sync RX circuit 36, a retime TX circuit 38, and a 1-to-4 DEMUX circuit 40. A check output circuit 42 and an error edge detect circuit 44 are also provided. The barrel shifter circuit 32 receives 4 respective synchronous STS-12's which are each read and byte-shifted so that they byte-align with the RX clock domain provided by the respective PLL 20. In other words, the barrel shifter readjusts the boundary of the A1 and A2 framing bytes so that one byte fully contains hex F6 and the other byte contains hex 28. When the barrel shifter 32 detects the A1 and A2 framing byte pattern, namely, 12 hex F6 followed by 12 hex 28, the barrel shifter 32 generates a FOUND_FAW flag which is provided to the respective input of the sync RX circuit 32 that includes a counter. By looking at the data when the FOUND_FAW flag is active, the barrel shifter 32 also shifts the incoming 32 bits in a way that the hex F6 and the hex 28 bytes are aligned. The FOUND_FAW flag sets a 2-bit counter in the sync RX 36 circuit whereby a sync signal sets the SONET frame counter once per frame. A LOAD_RX signal is generated by the 2-bit counter and is used to parallelize and retime the data in a 1-to-4 DEMUX scheme. This LOAD_RX signal guarantees that, when the frame start pattern flows through, the stack will be eventually loaded with the 32-bit word F6F62828, as depicted in FIG. 4.

On the other side the incoming sync signal sets another 2-bit counter that generates a LOAD_TX signal that is provided to the retime TX circuit 38. Advantageously, the retime TX circuit 38 responds to the LOAD_TX signal by safely transferring the data from the RX clock domain to the TX system clock domain. The LOAD_TX signal is used to retime the output data of point (3) on the system clock. The assumption about the sync guarantees that the LOAD_TX signal can only be high in three out of four system clock cycles, as depicted in FIG. 4. The synchronizing circuit in the RX side makes sure that the data out of the point (3) changes only in that one clock cycle when the LOAD_TX signal cannot be high. After this point, the data is muxed back to 78 Mhz. Thereafter, a parallel check is provided by circuit 42 to make sure that the F628 is actually flowing through the output data, and thereafter data is sent out of the demux circuit 40.

With reference to the sync RX circuit 36, each of the four STS-12's are slowed down to 19 Mbit/s according to FOUND_FAW location. Care is taken so that the A1A1A2A2 bytes show up in the data, as depicted in FIG. 4. Again, the RETIME_TX circuit operates such that the LOAD_TX signal is high once every four system clocks and the data stream is moved from the RX clock domain to the TX clock domain safely, which transition is safely supervised by the control logic, where 3 out of 4 periods are good for each retiming. Thereafter, the data is multiplex back to 78 Mbit/s. The check output circuit 42 insures that data is checked for loss of frame before being sent out of demux circuit 40.

Figure 4:
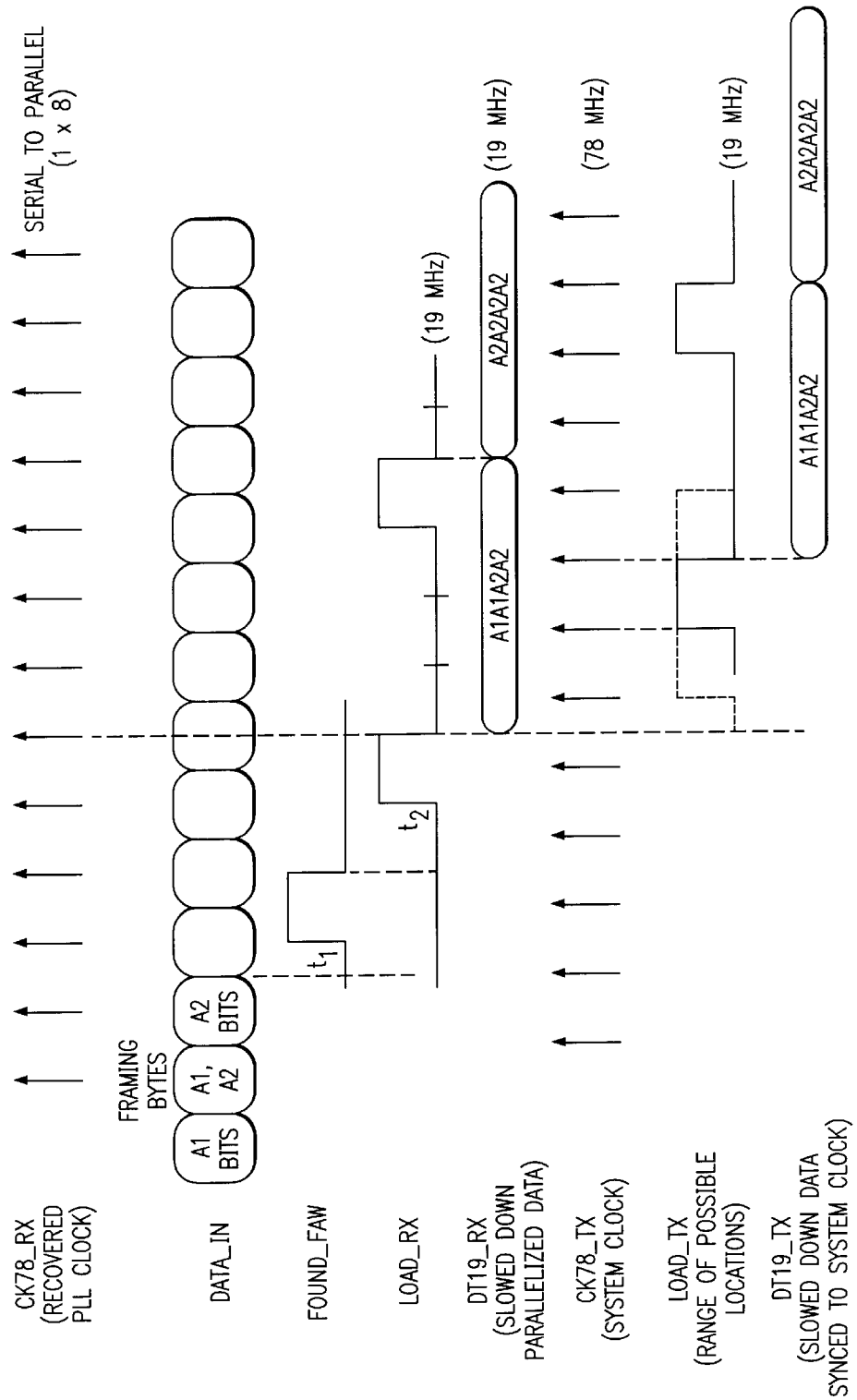
FIG. 4 is a timing diagram illustrating the synchronization of the data streams with the system clock running independently of the recovered clocks from the PLL's.

With respect to the RX side of the circuit in FIG. 2, the FOUND_FAW signal is responsively generated when the A1A2 framing bytes are detected, which sets the generation of the LOAD_RX signal as shown in FIG. 4. The LOAD_RX signal is active once every 4 RX clocks, whereby this signal is used for the serial-to-parallel conversion so that the 32-bit 19 Mbit/s word will contain A1A1A2A2. The sync signal is generated by the TX signal Sy78_REF of a control circuit 46.

The present invention drives technical advantages since the correct phase relationship between the LOAD_RX signal and the LOAD_TX signal provides for the safe crossover of data to the system clock. The frame counter of the sync RX counter generates the LOAD_TX signal to guarantee the safe crossover of the data to the system clock at 78 Mhz.

The present invention also derives technical advantages in terms of both reduced silicon area and power savings required of the ASIC 16. In this particular illustrated case, the savings can be quantified whereby the area saved is the number of retiming stages of Block 2, that is, 3×64×8 bits (approximately 20 kgates). Power consumption is also significantly reduced. Given its modularity, This design can be generalized and used for as many input frames as desired, providing even more savings. It can also be used within an SDH application (European standard) since it does not depend on the payload structure nor on the majority of the TOH, but only on the A1A2 framing bytes.

Figure 5:
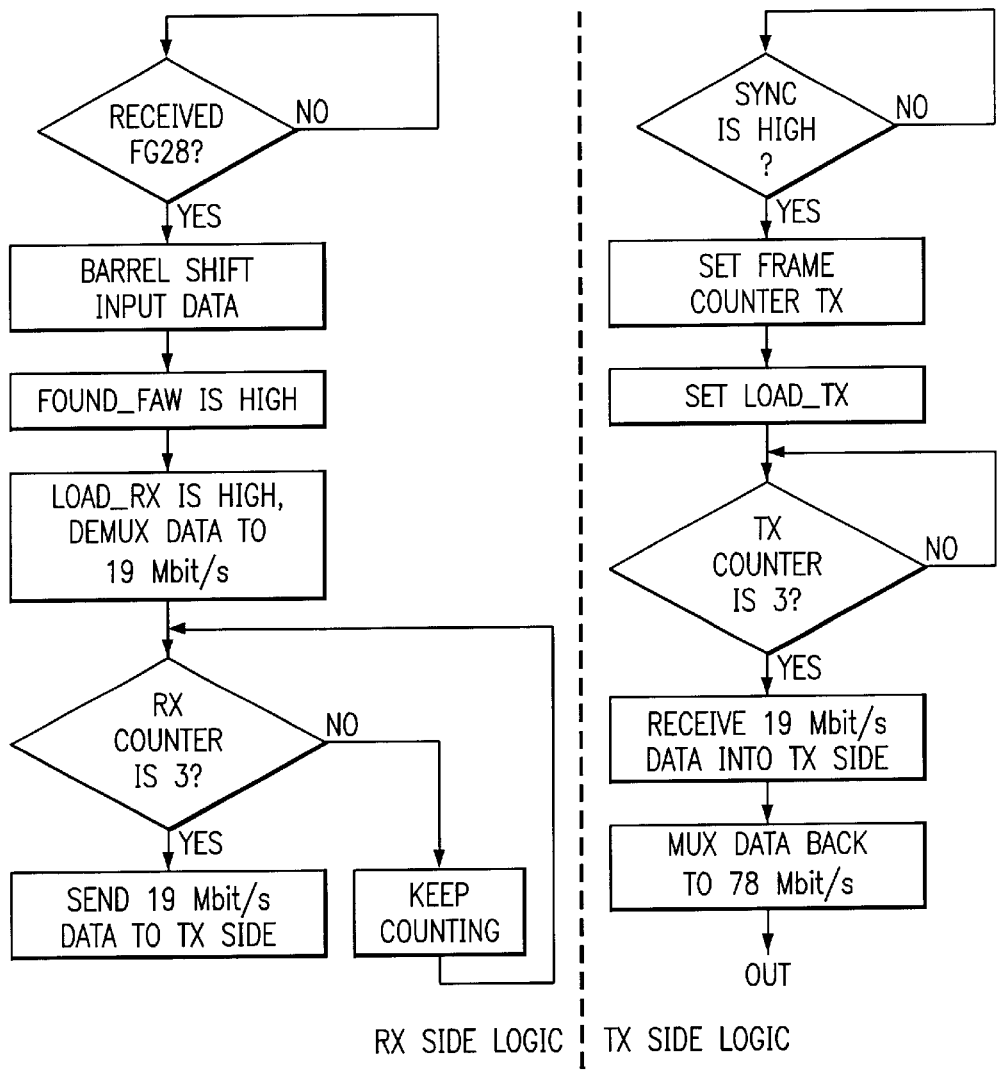
FIG. 5 is a flow chart illustrating the methodology of using a barrel shifter and associated logic circuitry according to the present invention.

Referring to FIG. 5, there is illustrated a flow chart of the methodology. It is noted that the RX and TX sides of the circuit are synchronized by totally independent circuits. The methodology of the present invention works because of the assumption of the data phase relationship. In fact, if the maximum data skew is 3 clock cycles, then this data needs to be spread among 4 cycles as described to be sure that during at least one clock cycle the data can be captured when it is stable. This is the reason why the data is slowed down by a factor of four by the MUX from 78 Mbit/s to 19 Mbit/s at the retime circuit 38, and as depicted in the timing diagram of FIG. 4. The assumption about the sync signal guarantees that the LOAD_TX signal can only be high in three out of four system clock cycles, and the synchronizing circuit in the RX side makes sure that the data out of point (3) changes only in that one clock cycle when the LOAD_TX signal cannot be high. If more data skew is required the proposed methodology can still be applied and only a scaling of the serial-to-parallel circuit is required. Again, after that the data is Muxed back to 78 Mhz.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

I claim:

1. A synchronization circuit for an optical cross-connect receiving input data, comprising:
    a first circuit performing frame alignment of the input data and also recovering a first clock from said input data;
    a system clock being out-of-phase with the first clock; and
    a frame circuit connected to the system clock and the first circuit that receives the input data from the first circuit, wherein the framer circuit retimes the input data from the first clock to a second clock.

2. The synchronization circuit as specified in claim 1 wherein said first circuit generates a timing signal indicative of said input data frame alignment, wherein said framer circuit retimes the input data as a function of said timing signal.

3. The synchronization circuit as specified in claim 2 wherein said framer circuit retimes the input data responsive to said timing signal.

4. The synchronization circuit as specified in claim 2 wherein said first clock and said system clock operate at the same frequency.

5. The synchronization circuit as specified in claim 1 wherein said framer circuit processes framing bytes of said input data to perform frame alignment.

6. The synchronization circuit of claim 5 wherein said framing bytes comprise an A1 and A2 framing byte.

7. The synchronization circuit of claim 2 wherein said first circuit includes a timing circuit that slows down the data rate of the input data while generating said timing signal.

8. The synchronization circuit of claim 7 wherein said timing circuit slows down the data rate to ¼ incoming data rate.

9. The synchronization circuit of claim 8 wherein said framer circuit generates a load signal once every four clocks of said system clock, wherein said framer circuit retimes the input data from the first clock to the system clock responsive to said load signal.

10. The synchronization circuit of claim 8 further comprising a MUX parallelizing the input data to slow down the data rate.

11. The synchronization circuit of claim 1 further comprising a plurality of phase lock loops (PLLS) receiving said input data and generating a plurality of non-phase aligned asynchronous clocks, wherein said framer circuit performs the data frame alignment as a function of said asynchronous clocks.

12. The synchronization circuit of claim 11 further comprising a plurality of pointer processors, one said PLL being associated with one said pointer processor.

13. The synchronization circuit of claim 1 wherein said framer circuit includes a barrel shifter circuit generating a frame signal upon detecting a framing byte.

14. The synchronization circuit of claim 13 further comprising a counter circuit counting as a function of said frame signal.

15. The synchronization circuit of claim 14 wherein said counter circuit generates a load signal after said counter circuit reaches a predetermined count.

16. The synchronization circuit of claim 15 wherein said framer circuit retimes the input data from the first clock to the second clock as a function of said load signal.

17. A method of retiming input data in an optical cross-connect having a system clock, comprising the steps of:
    (a) performing a frame alignment of the input data and recovering a data clock;
    (b) generating on output signal as a function of said frame alignment; and
    (c) retiming the frame aligned input data to the system clock as a function of said output signal.

18. The method as specified in claim 17 wherein said frame alignment is performed by slowing down the data rate of the input data by paralleling the input data.

19. The method as specified in claim 18 further comprising the step of generating the output signal in association with the slowed down input data.

20. The method as specified in claim 19 comprising the step of generating said output signal as a sync signal when it is safe to retime the input data from the data clock to the system clock.

* * * * *